United States Patent [19]

Maringer

[11] 3,984,760
[45] Oct. 5, 1976

[54] MEASUREMENT OF THE SYNCHRONIZATION OF A COMBUSTION ENGINE

[75] Inventor: Albert Maringer, Karlsruhe, Germany

[73] Assignee: Siemens Aktiengesellschaft, Munich, Germany

[22] Filed: Oct. 7, 1974

[21] Appl. No.: 512,897

[30] Foreign Application Priority Data
Oct. 8, 1973 Germany............................ 2350363

[52] U.S. Cl. .............................. 324/16 T; 73/116; 307/269; 324/15; 324/16 R
[51] Int. Cl.² .................. G01R 13/42; G01R 23/00; G01R 29/00
[58] Field of Search .................. 324/15, 16 R, 16 T, 324/16 S; 315/109 CD; 307/239, 269; 73/115, 116

[56] References Cited
UNITED STATES PATENTS

| | | | |
|---|---|---|---|
| 3,725,794 | 4/1973 | Asplund | 324/16 R |
| 3,775,672 | 11/1973 | Letosky | 324/16 T |
| 3,777,559 | 12/1973 | Rennick et al. | 324/16 S |
| 3,788,129 | 1/1974 | Trussell | 324/15 |
| 3,820,013 | 6/1974 | Trimble et al. | 324/16 R |
| 3,823,606 | 7/1974 | Maringer | 73/115 |
| 3,870,947 | 3/1975 | Fields | 324/16 R |

*Primary Examiner*—Saxfield Chatmon, Jr.
*Attorney, Agent, or Firm*—Kenyon & Kenyon Reilly Carr & Chapin

[57] ABSTRACT

Apparatus for the measurement of the synchronization of a combustion engine at suppressed ignition in a crank angle range measuring dead center using means for measuring the duration of the period of the breaker contact pulses for each combustion engine cylinder.

5 Claims, 1 Drawing Figure

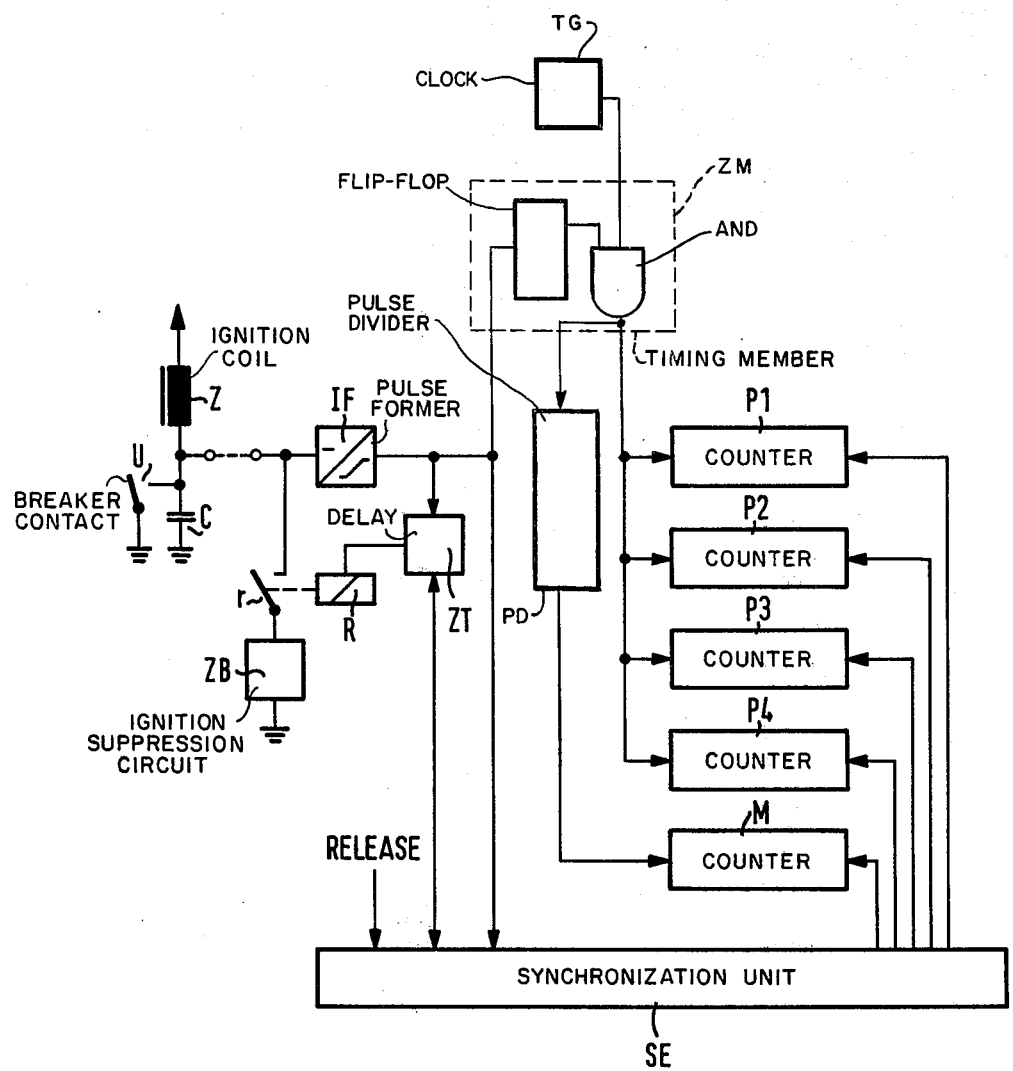

MEASUREMENT OF THE SYNCHRONIZATION OF A COMBUSTION ENGINE

BACKGROUND OF THE INVENTION

1. Field of the Invention

This invention concerns means for electronically measuring the synchronization of a combustion engine.

2. Description of the Prior Art

It is known from U.S. Pat. No. 3,823,606, to determine the compression pressure in the cylinders of a combustion engine by measuring the starter current when turning the engine over with suppressed ignition. The starter's current consumption maxima during the compression strokes of the individual cylinders of the engine are measured in this method. The starter current is determined in this method by means of the voltage drop at the grouding strap. In order to be able to compare the compression pressures of different vehicles, the grounding straps must be standardized regarding their resistance. The type of starter motor of course also influences its current comsumption. The signal obtained in this prior art manner is an analog signal which must first be converted into a digital signal before it can be processed further in a so called computer diagnosis. It is for these reasons that there is need for a method by which to compare compression pressures independent of the current consumption of the starter motor. The method should furnish a digital value as directly as possible.

It is known that, when turning a combustion engine over by means of a starter motor and at suppressed ignition, there occur synchronization fluctuations of the engine which result from surmounting the compression pressures during the compression strokes of the individual pistons in the cylinders. What is meant by synchronization fluctuations is that the starter motor and thus the crank shaft, cam shaft and distributor coupled thereto will not rotate at a constant speed but will tend to slow down in speed as compression increases. Normally, the higher the compression is the more effect this will have on the slowing down of rotational speed. Possible differences in these synchronization fluctuations give an indication of different compression pressure in the individual cylinders. These differences are particularly apparent in a crank angle range near the top dead center of each piston during its compression stroke.

It is an object of the invention to provide a circuit, by means of which the synchronization fluctuations can be measured.

SUMMARY OF THE INVENTION

According to the invention, this problem is solved in a circuit arrangement for the measurement of the synchronization i.e., changes in the speed of rotation or more correctly in the amount of time the distributor breaker points are opened, of a combustion engine driven by starter motor and equipped with an ignition system having an ingition coil and breaker points or contacts, in a crank angle range near the top dead center and with suppressed ignition. The connecting point of the interrupter contact and the ignition coil is connected to means for measuring the duration of the period of the breaker contact, pulse. The breaker contact is actuated for each cylinder synchronous with the crankshaft of the combustion engine in a crank angle range near top dead center of the respective piston. The means for measuring the duration of the period of the breaker contact pulse preferably includes a flip flop which is switched by the leading and trailing edges of the breaker contact pulse between its two stable states, an AND gate having as one input the output of the flip flop, a clock generator providing the other input to the AND gate and a pluse counter coupled to the output of the AND gate.

The duration of the interrupter pulse period is determined by the number of pulses stored in the pulse counter. It is thus possible to determine the duration of the interrupter pulse for each cylinder. The individual time periods found can be compared with each other or with a standard.

It is of advantage if a pulse former precedes the timing member.

In the illustrated embodiment of the invention the pulse counter comprises a plurality of pulse or count storage units equal to the number of cylinders in the engine. A sychronizing circuit is provided to sequentially enable each of the counters to accept inputs from the AND gate corresponding to a specific cylinder. The synchronizing circuit also includes reset means for resetting all counters. In conjunction with these counters it is preferable to have an additional counter having at its input a pulse divider coupled to the output of the AND gate and having a pulse reduction ratio of 1 to the number of cylinders in the engine. Thus, this unit will maintain an average with which the pulses in the other pulse storage units can be compared.

The circuit arrangement can be utilized, on the one hand, as a compression pressure comparator to compare the compression pressures in the individual cylinders to each other or to a mean value. On the other hand, it can also be utilized as a test instrument to test the normal function of the starter and its accessory equipment.

BRIEF DESCRIPTION OF THE DRAWING

The drawing shows an embodiment, in block diagram form, of a circuit for measuring engine synchronization fluctuation of a combustion engine.

DESCRIPTION OF THE INVENTION

In the drawing the primary winding of an ignition coil Z is connected to the positive terminal of the vehicle battery not shown, and to ground by way of the breaker contact U. A capacitor C for the suppression of sparks occuring at the contact is connected parallel to the breaker contact. Connected to the connecting point of breaker U an ignition coil Z is a working contact $r$ of a relay R which grounds this point by way of an ignition suppression circuit ZB. The relay is coupled through delay member ZT. Upon detection of the first pulse from a former IF, member ZT energizes relay R to close contact $r$ to cause coil 2 to be grounded through ignition suppression circuit Zb. In this condition, the ignition voltage supplied by the high voltage winding of the ignition coil is insufficient to produce an ignition spark at the electrodes of the spark plugs of the combustion engine. The delay member ZT is also coupled to a synchronizing unit SE. In order to allow the starter motor to come up to speed delay member ZT provides a delay of 3 seconds after which it provides an output to synchronizing unit SE indicating that a measuring sequence can start.

The connecting point of the breaker contact U and the ignition coil Z is also connected to the input of the pulse forming stage IF which converts, even when the breaker is included in the ignition suppression circuit ZB, the interrupter contact pulse into a normalized pulse, the edges of which present no processing problems. The output of the pulse forming stage IF is also connected to an input of the synchronizing unit SE and the input of a timing member ZM. As illustrated it is coupled to the input of a flip flop. The flip flop is arranged so that it sits on a leading edge of a pulse from the pulse former IF and resets on the trailing edge of the pulse therefrom. The output of the flip flop provides an enabling input to an AND gate. The second input to the AND gate is from a clock generator TG which emits a clock pulse sequence of constant recurrent frequency. Thus, the pulses from the clock will be gated through the AND gate during the time that the flip flop is set. This time will be equal to the time that the breaker contacts are opened. Thus, the number of pulses during this time will be proportional to the time the contacts are opened. The output of the AND gate of the timing member ZM is connected to parallel inputs of count storage units P1 to P4 i.e., a four cylinder engine is assumed with one count storage unit provided for each cylinder. There is also connected to the timing member ZM another count storage unit M containing in its input a pulse frequency divider, PD, reducing the frequency of an input pulse sequence in the ratio of 1 to the number of engine cylinders in a manner well known in the art. For the illustrated embodiment with four cylinders, this may simply be a divide by four counter. Therefore, after two revolutions of the engine, a mean value for the duration of the period of the breaker contact pulse is stored in the count storage unit M. The count storage units P1 to P4 and M have enable inputs addressed by the synchronizing unit SE. As noted above, the synchronizing unit SE enables the counter P1, P2, P3 and P4 in sequence to cause them to store a number of counts proportional to the time the breaker points are open for a given cylinder. The count storage unit M is enabled whenever any of these other counters is enabled so that it will store a value equal to the average of the values stored in the other counters due to the division in the pulse divider PD. In addition, the synchronizing unit is used to coordinate or synchronize each breaker contact opening with a particular counter. The synchronizing unit can be of the type described in the aforementioned U.S. Pat. No. 3,823,606. It selectively and sequentially enables each of the counters P1, P2, P3 and P4 as the breaker contact opens to deliver a firing pulse to the corresponding cylinder. As a result, the count stored in each of these count storage units will represent the amount of time the breaker contacts were opened as the corresponding cylinder was near top dead center. As noted above, this is directly related to the compression in that cylinder. Basically, the synchronization unit operates in the manner described in the aforementioned patent. After a measurement cycle with the ignition suppressed, an output from synchronizing unit SE to delay ZT causes relay R to be de-energized. Then two ignition cycles take place with the first pulse of the first cycle loaded into a ring counter and then shifted through the states of the ring counter for two successive cycles. At the end of that time a correlation is obtained between the value stored in the count storage units and the individual cylinders. The exact manner in which this occurs is fully described in the aforementioned patent.

What is claimed is:

1. Apparatus for the measurement of the synchronization of a multiple cylinder combustion engine in a crank angle range near top dead center during suppressed ignition in order to obtain a measure of the compression in each of the cylinders, said engine driven by a starter motor and equipped with an ignition system coil connected at a connecting point to a breaker contact for generating a breaker contact pulse, comprising:
   a. means for suppression of the ignition during measurement;
   b. means having an input coupled to the connecting point, for measuring the duration of each breaker contact pulse, said means providing an output proportional thereto for each pulse;
   c. a plurality of storage means equal in number of the number of cylinders in said engine, each having as an input the output of said timing means; and
   d. synchronizing means having an input coupled to said connecting point and providing a plurality of outputs, one being provided to each of said storage means, said outputs coupled to said storage means for measuring to be sequentially stored in each of said storage means.

2. The apparatus of claim 1 wherein each of said storage means comprise a pulse counter and wherein said means for measuring comprise:
   a. a flip flop having its input coupled to said connection point switchable from one stable state to the other on the occurrence of the beginning or the end of said breaker pulse;
   b. a clock generator circuit; and
   c. an AND gate having two inputs and an output, one input of said AND gate coupled to the output of said flip flop, and the other input of said AND gate coupled to said clock generator and the output of said AND gate coupled in parallel to all of said storage means.

3. The apparatus of claim 1 further comprising a pulse shaper circuit connected between said means for measuring and said connecting point.

4. The apparatus of claim 2 wherein said pulse counter comprises,
   a number of count storage units, said number corresponding to the number of combustion engine cylinders, each of said count storage units having a counting input and a enable input,
   parallel connecting leads from the output of said AND gate, one connected to each count storage unit counting input, and
   parallel connecting leads from the output of said synchronization unit, one connected to each count storage unit enable input.

5. The apparatus of claim 4 and further including: additional storage means in the form of a pulse counter having a data input and an enable input; a pulse division circuit having a reduction ratio of 1 to the number of cylinders of the engine having its output coupled to the data input of said additional storage means and having its input coupled to the output of said AND circuit; and, said synchronization means having a further output coupled to the enable input of said additional storage means, said synchronization unit enabling said storage means when any of said plurality of storage means are enabled.

* * * * *

UNITED STATES PATENT OFFICE
CERTIFICATE OF CORRECTION

Patent No. 3,984,760          Dated October 5, 1976

Inventor(s) Albert Maringer

It is certified that error appears in the above-identified patent and that said Letters Patent are hereby corrected as shown below:

Column 1, line 18, "grouding" should read -- grounding --.

Claim 1, subparagraph d) should read:

d) synchronizing means having an input coupled to said connecting point and providing a plurality of outputs, one being provided to each of said storage means, said outputs coupled to said storage means so as to enable the output of said means for measuring to be sequentially stored in each of said storge means.

Signed and Sealed this

Nineteenth Day of April 1977

[SEAL]

Attest:

RUTH C. MASON
Attesting Officer

C. MARSHALL DANN
Commissioner of Patents and Trademarks